United States Patent
Yin et al.

(10) Patent No.: US 8,823,336 B2
(45) Date of Patent: Sep. 2, 2014

(54) BRIDGELESS POWER FACTOR CORRECTOR WITH SINGLE CHOKE AND METHOD OF OPERATING THE SAME

(71) Applicant: Chicony Power Technology Co., Ltd., New Taipei (TW)

(72) Inventors: Lieh-Chung Yin, New Taipei (TW); Chia-Hsien Yen, New Taipei (TW)

(73) Assignee: Chicony Power Technology Co., Ltd, New Taipei (TW)

( * ) Notice: Subject to any disclaimer, the term of this patent is extended or adjusted under 35 U.S.C. 154(b) by 168 days.

(21) Appl. No.: 13/670,012

(22) Filed: Nov. 6, 2012

(65) Prior Publication Data

US 2014/0125297 A1    May 8, 2014

(51) Int. Cl.
*H02M 1/12* (2006.01)
*H02M 7/00* (2006.01)

(52) U.S. Cl.
USPC ........... 323/222; 323/223; 323/224; 323/225; 323/268; 323/271

(58) Field of Classification Search
USPC ................. 323/222, 223, 224, 225, 268, 271
See application file for complete search history.

(56) References Cited

U.S. PATENT DOCUMENTS

| | | | |
|---|---|---|---|
| 2010/0289461 A1* | 11/2010 | Wang et al. | 323/205 |
| 2011/0013436 A1* | 1/2011 | Gan et al. | 363/126 |
| 2011/0037444 A1* | 2/2011 | Wildash | 323/210 |
| 2011/0149622 A1* | 6/2011 | Lin | 363/124 |
| 2011/0222318 A1* | 9/2011 | Uno et al. | 363/21.05 |
| 2011/0260700 A1* | 10/2011 | Chen et al. | 323/207 |
| 2012/0008351 A1* | 1/2012 | Yonezawa et al. | 363/89 |
| 2012/0069615 A1* | 3/2012 | Tomioka | 363/126 |
| 2013/0049709 A1* | 2/2013 | Fu et al. | 323/205 |
| 2013/0050879 A1* | 2/2013 | Mao et al. | 361/18 |

* cited by examiner

*Primary Examiner* — Bao Q Vu
(74) *Attorney, Agent, or Firm* — Muncy, Geissler, Olds & Lowe, P.C.

(57) ABSTRACT

A bridgeless power factor corrector with a single choke is electrically connected to an AC power source. The bridgeless power factor corrector includes a choke element, a first switch, a second switch, a first diode, a second diode, a capacitor, a first rectify diode, and a second rectify diode. The choke element is electrically connected between the first switch and the second switch. The first switch and the second switch are controlled to be turned on or turned off by a first control signal and a second control signal, respectively, to provide a power factor correction for the AC power source when the AC power source is in a positive half cycle or a negative half cycle. Furthermore, a method of operating the bridgeless power factor corrector is provided.

18 Claims, 7 Drawing Sheets

BRIDGELESS POWER FACTOR CORRECTOR WITH SINGLE CHOKE AND METHOD OF OPERATING THE SAME

BACKGROUND

1. Technical Field

The present disclosure relates generally to a bridgeless power factor corrector and a method of operating the same, and more particularly to a bridgeless power factor with a single choke and a method of operating the same.

2. Description of Related Art

PFC (power factor correction) circuit is widely used as a power conversion circuit in electronic devices at present. The PFC circuit is provided to correct the power factor of the AC power source to bring it as close to unity. The PFC can be expressed utilization efficiency of the electrical power for the electronic products: higher power factor, higher utilization efficiency of the electrical power, and vice versa. Accordingly, electronic products usually provide a PFC function to significantly increase utilization efficiency of the electrical power.

Reference is made to FIG. 1 which is a circuit diagram of a related art full-bridge power factor corrector. Because the boost power factor corrector (boost PFC) can achieve effects of higher power factor and lower harmonic, the boost PFC is usually provided for power factor correction. The boost PFC is composed of a bridge rectifier 12A, a choke 13A, a switch 14A, a diode 15A, a resistor 16A, and a capacitor 17A. The boost PFC is electrically connected to an external AC power source 10A and a PFC controller (not shown) is provided to control the switch 14A according to the input current and input voltage of the external AC power source 10A so that phase of the input current follows phase of the input voltage to achieve high power factor by switching the switch 14A using a high-frequency scheme. In addition, an EMI filter 11A can be also installed between the external AC power source 10A and the boost PFC to eliminate noise in the external AC power source 10A.

For the traditional boost PFC, however, a plurality of bridge diodes of the bridge rectifier 12A produce a higher proportion of power losses comparing with the whole conversion losses, thus reducing the conversion efficiency.

Reference is made to FIG. 2 which is a circuit diagram of a related art bridgeless power factor corrector. The bridgeless power factor corrector (bridgeless PFC) includes a first choke 23_1A, a second choke 23_2A, a first switch 24_1A, a second switch 24_2A, a first diode 25_1A, a second diode 25_2A, a resistor 26A, a capacitor 27A, a first rectify diode 28_1A, a second rectify diode 28_2A, a first bypass diode 29_1A, and a second bypass diode 29_2A. The bridgeless PFC is electrically connected to an external AC power source 20A and a PFC controller (not shown) is provided to control the first switch 24_1A and the second switch 24_2A according to the input current and input voltage of the external AC power source 20A so that phase of the input current follows phase of the input voltage to achieve high power factor by switching the first switch 24_1A and the second switch 24_2A using a high-frequency scheme. In addition, an EMI filter 21A can be also installed between the external AC power source 20A and the bridgeless PFC to eliminate noise in the external AC power source 20A.

The traditional bridgeless PFC uses two chokes (namely, the first choke 23_1A and the second choke 23_2A) for storing energy and releasing energy. Also, one choke works when the external AC power source 20A is in a positive half cycle and the other choke works in a negative half cycle that is one of the two chokes is in an idle condition whether the external AC power source 20A is in the positive half cycle or the negative half cycle. Therefore, utilization rate of the two chokes is lower. In addition, the required occupied space of the two chokes is usually larger due to inherent characteristics of the choke, such as the core, the winding thereof.

Accordingly, it is desirable to provide a bridgeless power factor corrector with a single choke to correct the power factor of the AC power source, increase conversion efficiency, and reduce occupied space and increase utilization rate of the choke element.

SUMMARY

An object of the invention is to provide a bridgeless power factor corrector with a single choke to solve the above-mentioned problems. Accordingly, the bridgeless power factor corrector is electrically connected to an AC power source. The bridgeless power factor corrector includes a choke element, a first switch, a second switch, a first diode, a second diode, a capacitor, a first rectify diode, and a second first rectify diode. The choke element has a first terminal and a second terminal. The first switch has a first terminal and a second terminal, the first terminal is connected to a first terminal of the AC power source and the second terminal is connected to the first terminal of the choke element. The second switch has a first terminal and a second terminal, the first terminal is connected to a second terminal of the AC power source and the second terminal is connected to the second terminal of the choke element. The first diode has an anode and a cathode, the anode is connected to the first terminal of the choke element. The second diode has an anode and a cathode, the anode is connected to the second terminal of the choke element and the cathode is connected to the cathode of the first diode. The capacitor has a first terminal and a second terminal, the first terminal is connected to the cathode of the first diode and the second terminal is connected to a ground. The first rectify diode has an anode and a cathode, the anode is connected to the second terminal of the capacitor and the cathode is connected to the first terminal of the first switch. The second rectify diode has an anode and a cathode, the anode is connected to the second terminal of the capacitor and the cathode is connected to the first terminal of the second switch. The first switch and the second switch are controlled to be turned on or turned off by a first control signal and a second control signal, respectively, and configured to provide a power factor correction for the AC power source when the AC power source is in a positive half cycle or a negative half cycle.

Another object of the invention is to provide a method of operating a bridgeless power factor corrector with a single choke to solve the above-mentioned problems. Accordingly, the bridgeless power factor corrector is electrically connected to an AC power source. The method includes the following steps: (a) a choke element is provided; the choke element has a first terminal and a second terminal is provided; (b) a first switch and a second switch are provided; the first switch has a first terminal and a second terminal, the first terminal is connected to a first terminal of the AC power source and the second terminal is connected to the first terminal of the choke element; the second switch has a first terminal and a second terminal, the first terminal is connected to a second terminal of the AC power source and the second terminal is connected to the second terminal of the choke element; (c) a first diode and a second diode are provided; the first diode has an anode and a cathode, the anode is connected to the first terminal of the choke element; the second diode has an anode and a cathode, the anode connected to the second terminal of the choke element and the cathode connected to the cathode of the first diode; (d) a capacitor is provided; the capacitor has a first terminal and a second terminal, the first terminal is connected to the cathode of the first diode and the second terminal is connected to a ground; (e) a first rectify diode and a second rectify diode are provided; the first rectify diode has an anode and a cathode, the anode is connected to the second terminal of the capacitor, the cathode is connected to the first terminal of the first switch; the second rectify diode has an anode and a cathode, the anode is connected to the second terminal of the capacitor and the cathode is connected to the first terminal of the second switch; and (f) the first switch and the second switch are turned on or turned off by a first control signal and a second control signal, respectively, to provide a power factor correction for the AC power source when the AC power source is in a positive half cycle or a negative half cycle.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION

Figure 1:
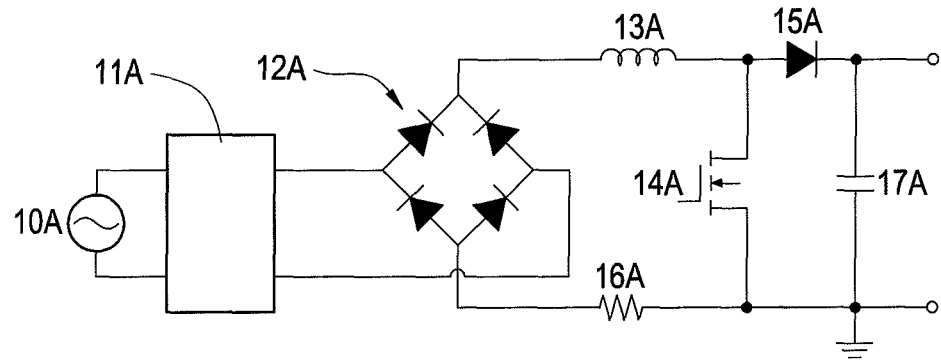
FIG. 1 is a circuit diagram of a related art full-bridge power factor corrector.
Figure 2:
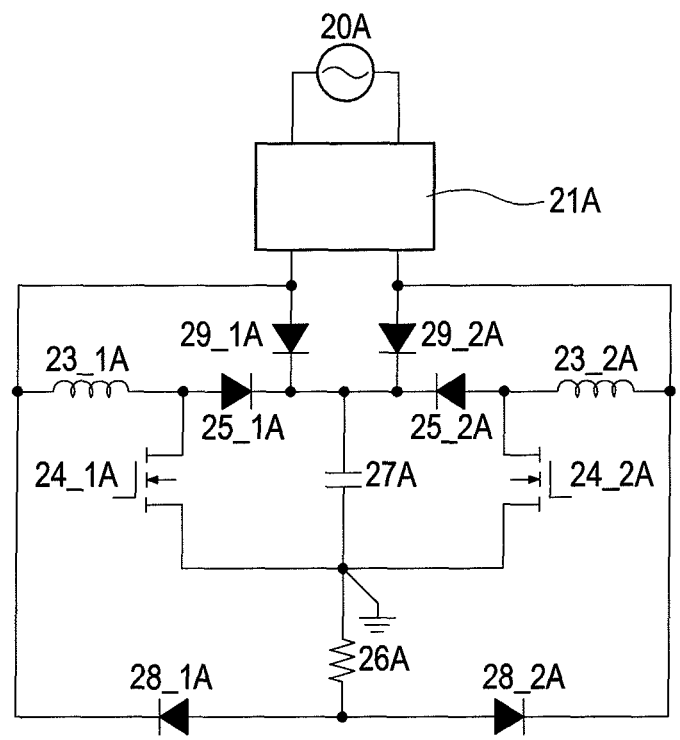
FIG. 2 is a circuit diagram of a related art bridgeless power factor corrector.

Reference will now be made to the drawing figures to describe the present disclosure in detail.

Figure 3:
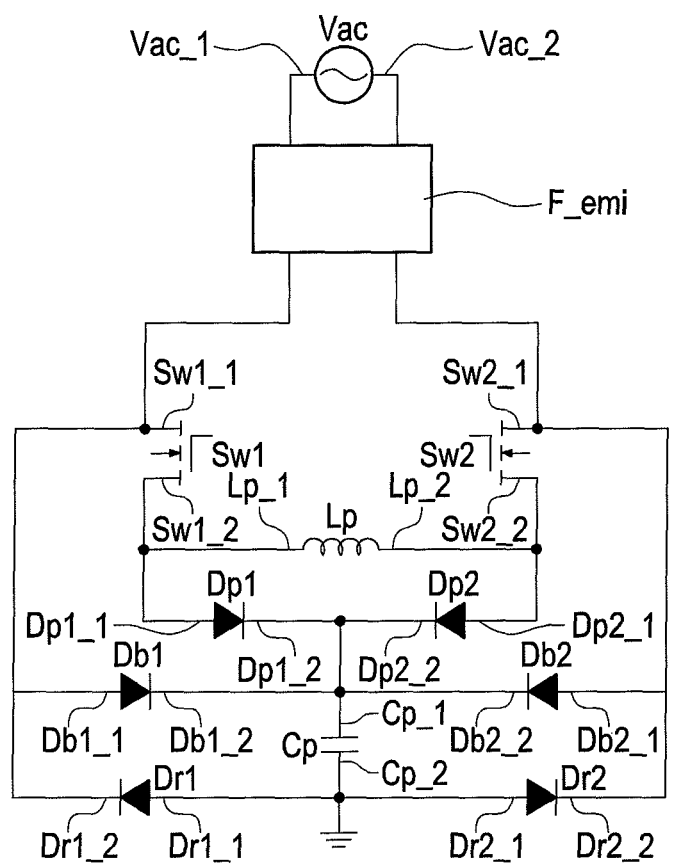
FIG. 3 is a circuit diagram of a bridgeless power factor corrector with a single choke according to the present invention.

Reference is made to FIG. 3 which is a circuit diagram of a bridgeless power factor corrector with a single choke according to the present invention. The bridgeless power factor corrector is electrically connected to an AC power source Vac. The bridgeless power factor corrector includes a choke element Lp, a first switch Sw1, a second switch Sw2, a first diode Dp1, a second diode Dp2, a capacitor Cp, a first rectify diode Dr1, and a second rectify diode Dr2. In addition, an electromagnetic interference filter (EMI filter) F_emi is electrically connected between the bridgeless power factor corrector and the AC power source Vac to eliminate noise in the AC power source Vac. As shown in FIG. 3, the choke element Lp has a first terminal Lp_1 and a second terminal Lp_2. The first switch Sw1 has a first terminal Sw1_1 and a second terminal Sw1_2, the first terminal Sw1_1 is connected to a first terminal Vac_1 of the AC power source Vac and the second terminal Sw1_2 is connected to the first terminal Lp_1 of the choke element Lp. The second switch Sw2 has a first terminal Sw2_1 and a second terminal Sw2_2, the first terminal Sw2_1 is connected to a second terminal Vac_2 of the AC power source Vac and the second terminal Sw2_2 is connected to the second terminal Lp_2 of the choke element Lp. Especially, the first switch Sw1 and the second switch Sw2 can be MOFETs, BJTs, or IGBTs. However, the embodiments are only exemplified but are not intended to limit the scope of the disclosure. The first diode Dp1 has an anode Dp1_1 and a cathode Dp1_2, the anode Dp1_1 is connected to the first terminal Lp_1 of the choke element Lp. The second diode Dp2 has an anode Dp2_1 and a cathode Dp2_2, the anode Dp2_1 is connected to the second terminal Lp_2 of the choke element Lp and the cathode Dp2_2 is connected to the cathode Dp1_2 of the first diode Dp1. The capacitor Cp has a first terminal Cp_1 and a second terminal Cp_2, the first terminal Cp_1 is connected to the cathode Dp1_2 of the first diode Dp1 and the second terminal Cp_2 is connected to a ground (not labeled). The first rectify diode Dr1 has an anode Dr1_1 and a cathode Dr1_2, the anode Dr1_1 is connected to the second terminal Cp_2 of the capacitor Cp and the cathode Dr1_2 is connected to the first terminal Sw1_1 of the first switch Sw1. The second rectify diode Dr2 has an anode Dr2_1 and a cathode Dr2_2, the anode Dr2_1 is connected to the second terminal Cp_2 of the capacitor Cp and the cathode Dr2_2 is connected to the first terminal Sw2_1 of the second switch Sw2. In particular, the first switch Sw1 and the second switch Sw2 are controlled to be turned on or turned off by a first control signal Sc1 and a second control signal Sc2, respectively, to provide a power factor correction for the AC power source Vac when the AC power source Vac is in a positive half cycle or a negative half cycle. Especially, the bridgeless power factor corrector further includes a first bypass diode Db1 and a second bypass diode Db2. The first bypass diode Db1 has an anode Db1_1 and a cathode Db1_2, the anode Db1_1 is connected to the first terminal Sw1_1 of the first switch Sw1 and the cathode Db1_2 is connected to the first terminal Cp_1 of the capacitor Cp to provide an over-voltage protection for the first switch Sw1, the first diode Dp1, the first rectify diode Dr1, and the choke element Lp. The second bypass diode Db2 has an anode Db2_1 and a cathode Db2_2, the anode Db2_1 is connected to the first terminal Sw2_1 of the second switch Sw2 and the cathode Db2_2 is connected to the first terminal Cp_1 of the capacitor Cp to provide an over-voltage protection for the second switch Sw2, the second diode Dp2, the second rectify diode Dr2, and the choke element Lp.

The detailed operation of the bridgeless power factor corrector in the positive half cycle and the negative half cycle will be described hereinafter with reference to figures.

Figure 4A:
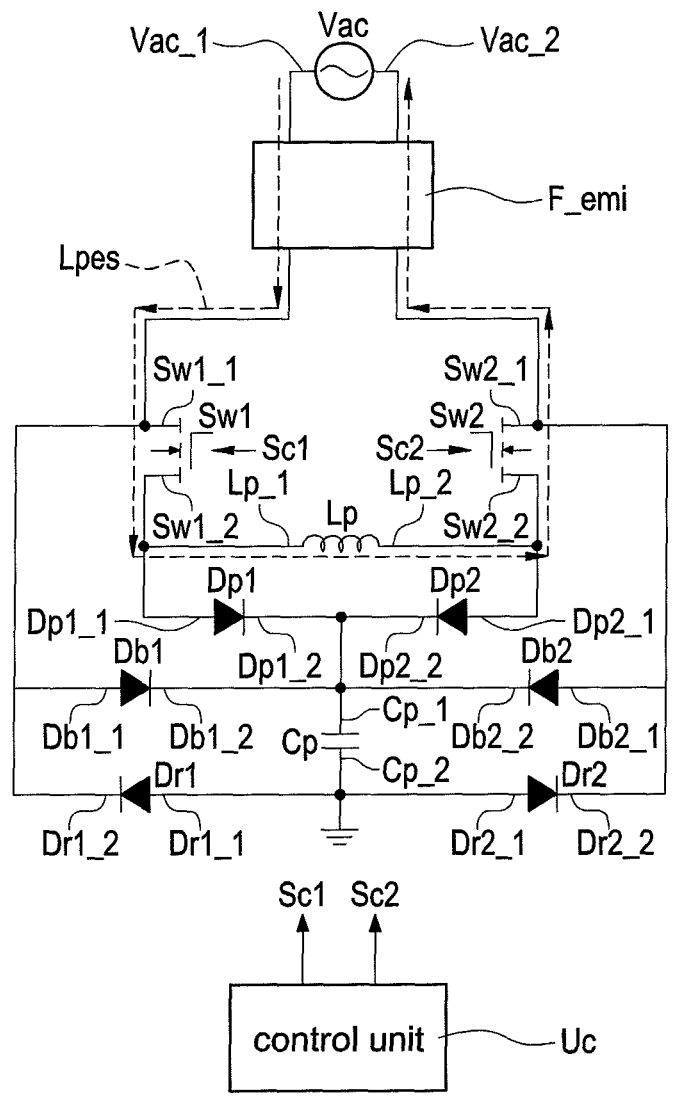
FIG. 4A is a circuit diagram of operating the bridgeless power factor corrector when an AC power source is in a positive half cycle and the choke element is in an energy-storing operation according to the present invention.

Reference is made to FIG. 4A which is a circuit diagram of operating the bridgeless power factor corrector when an AC power source is in a positive half cycle and the choke element is in an energy-storing operation according to the present invention. Especially, the bridgeless power factor corrector further includes a control unit Uc. The control unit Uc produces the first control signal Sc1 and the second control signal Sc2 to control the first switch Sw1 and the second switch Sw2, respectively, to provide the power factor correction for the AC power source Vac. The control unit Uc switches the first switch Sw1 and the second switch Sw2 to provide an energy-storing operation to the choke element Lp through a positive half cycle energy-storing loop Lpes sequentially formed by the AC power source Vac, the first switch Sw1, the choke element Lp, the second switch Sw2, and the AC power source Vac when the AC power source Vac is in the positive half cycle and the choke element Lp is in an energy-storing operation.

Figure 4B:
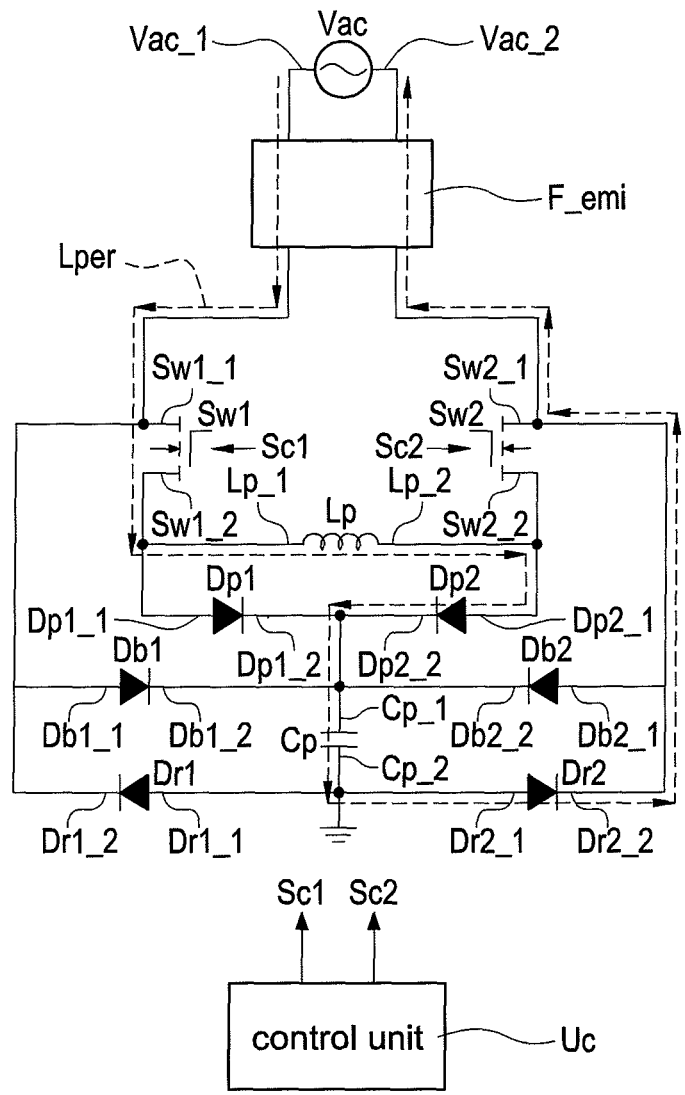
FIG. 4B is a circuit diagram of operating the bridgeless power factor corrector when the AC power source is in the positive half cycle and the choke element is in an energy-releasing operation according to the present invention.

Reference is made to FIG. 4B which is a circuit diagram of operating the bridgeless power factor corrector when the AC power source is in the positive half cycle and the choke element is in an energy-releasing operation according to the present invention. The control unit Uc switches the first switch Sw1 and turns off the second switch Sw2 to provide an energy-releasing operation to the choke element Lp through a positive half cycle energy-releasing loop Lper sequentially formed by the choke element Lp, the second diode Dp2, the capacitor Cp, the second rectify diode Dr2, the AC power source Vac, the first switch Sw1, and the choke element Lp when the AC power source Vac is in the positive half cycle and the choke element Lp is in an energy-releasing operation.

Figure 5A:
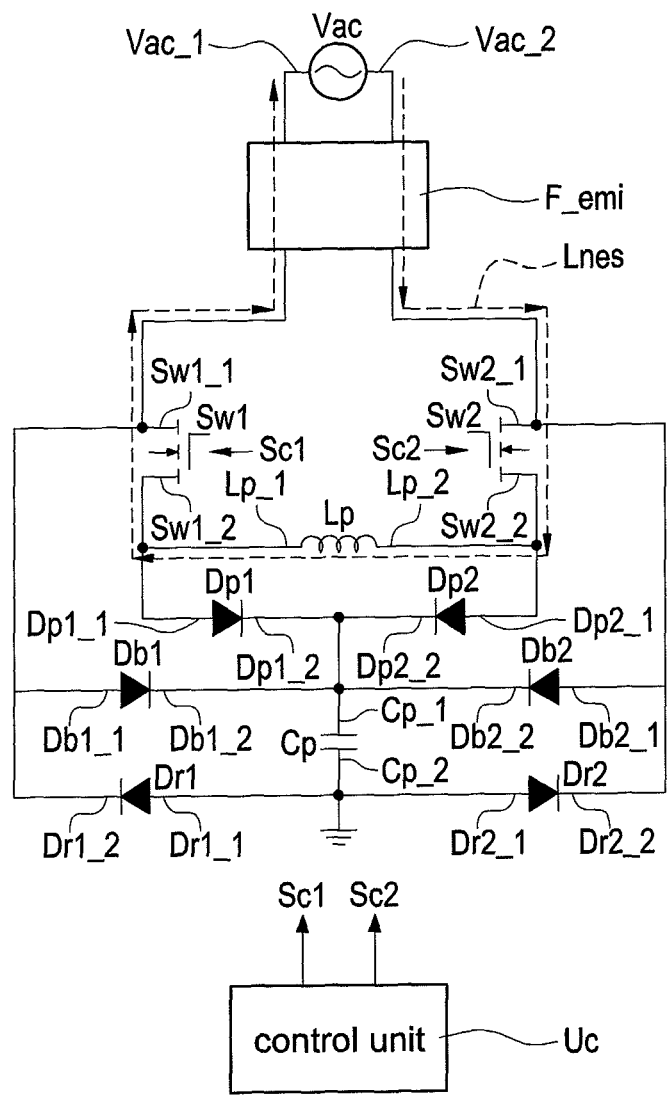
FIG. 5A is a circuit diagram of operating the bridgeless power factor corrector when the AC power source is in a negative half cycle and the choke element is in an energy-storing operation according to the present invention.

Reference is made to FIG. 5A which is a circuit diagram of operating the bridgeless power factor corrector when the AC power source is in a negative half cycle and the choke element is in an energy-storing operation according to the present invention. The control unit Uc switches the first switch Sw1 and the second switch Sw2 to provide an energy-storing operation to the choke element Lp through a negative half cycle energy-storing loop Lnes sequentially formed by the AC power source Vac, the second switch Sw2, the choke element Lp, the first switch Sw1, and the AC power source Vac when the AC power source Vac is in the negative half cycle and the choke element Lp is in an energy-storing operation.

Figure 5B:
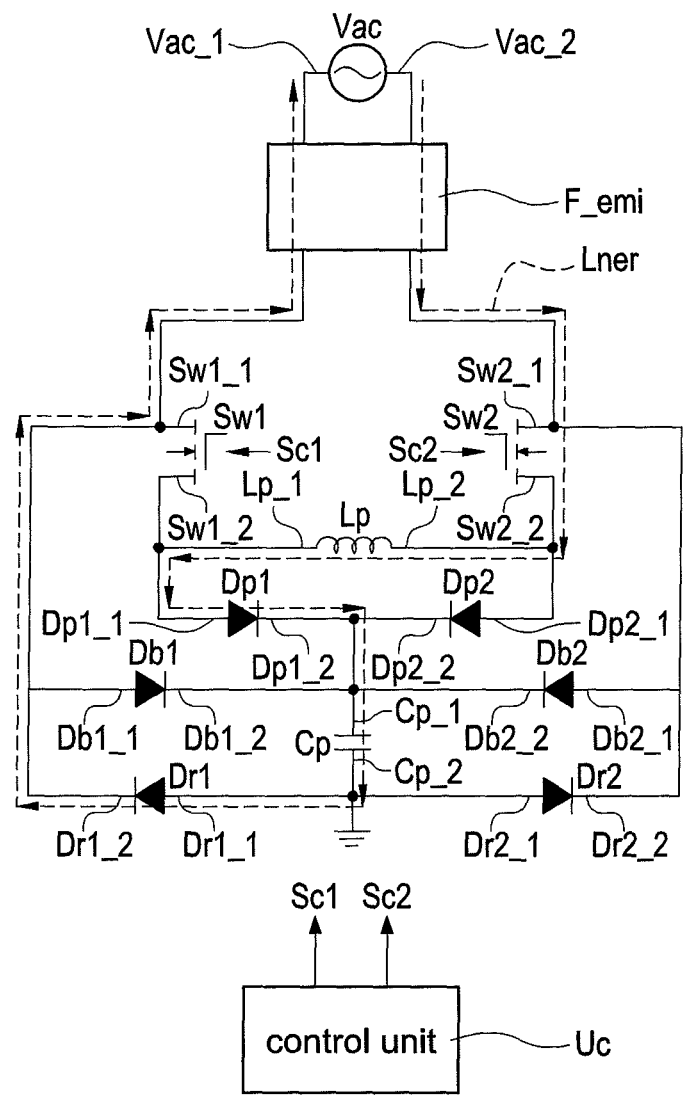
FIG. 5B is a circuit diagram of operating the bridgeless power factor corrector when the AC power source is in the negative half cycle and the choke element is in an energy-releasing operation according to the present invention.

Reference is made to FIG. 5B which is a circuit diagram of operating the bridgeless power factor corrector when the AC power source is in the negative half cycle and the choke element is in an energy-releasing operation according to the present invention. The control unit Uc switches the second switch Sw2 and turns off the first switch Sw1 to provide an energy-releasing operation to the choke element Lp through a negative half cycle energy-releasing loop Lner sequentially formed by the choke element Lp, the first diode Dp1, the capacitor Cp, the first rectify diode Dr1, the AC power source Vac, the second switch Sw2, and the choke element Lp when the AC power source Vac is in the negative half cycle and the choke element Lp is in an energy-releasing operation.

Figure 6:
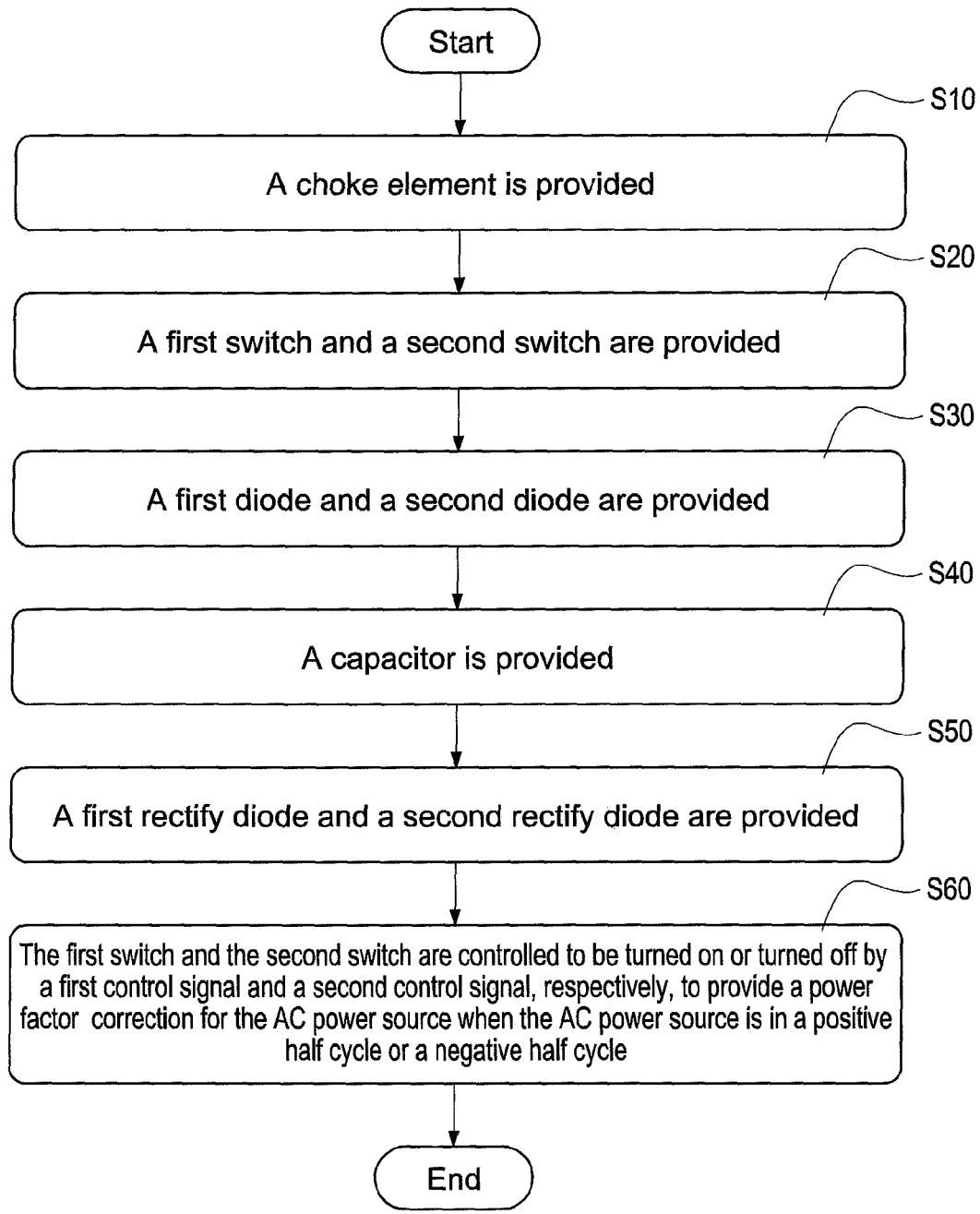
FIG. 6 is a flowchart of a method of operating a bridgeless power factor corrector according to the present invention.

Reference is made to FIG. 6 which is a flowchart of a method of operating a bridgeless power factor corrector according to the present invention. The bridgeless power factor corrector is electrically connected to an AC power source. An electromagnetic interference filter (EMI filter) is electrically connected between the bridgeless power factor corrector and the AC power source to eliminate noise in the AC power source. The method includes following steps: A choke element is provided (S10). The choke element has a first terminal and a second terminal. A first switch and a second switch are provided (S20). The first switch has a first terminal and a second terminal, the first terminal is connected to a first terminal of the AC power source and the second terminal is connected to the first terminal of the choke element. The second switch has a first terminal and a second terminal, the first terminal is connected to a second terminal of the AC power source and the second terminal is connected to the second terminal of the choke element. Especially, the first switch and the second switch can be MOFETs, BJTs, or IGBTs. However, the embodiments are only exemplified but are not intended to limit the scope of the disclosure. A first diode and a second diode are provided (S30). The first diode has an anode and a cathode, the anode is connected to the first terminal of the choke element. The second diode has an anode and a cathode, the anode is connected to the second terminal of the choke element and the cathode is connected to the cathode of the first diode. A capacitor is provided (S40). The capacitor has a first terminal and a second terminal, the first terminal is connected to the cathode of the first diode and the second terminal is connected to a ground. A first rectify diode and a second rectify diode are provided (S50). The first rectify diode has an anode and a cathode, the anode is connected to the second terminal of the capacitor and the cathode is connected to the first terminal of the first switch. The second rectify diode has an anode and a cathode, the anode is connected to the second terminal of the capacitor and the cathode is connected to the first terminal of the second switch. The first switch and the second switch are controlled to be turned on or turned off by a first control signal and a second control signal, respectively, to provide a power factor correction for the AC power source when the AC power source is in a positive half cycle or a negative half cycle (S60). In particular, the first control signal and the second control signal are produced by a control unit. The method further includes a step: A first bypass diode and a second bypass diode are provided. The first bypass diode has an anode and a cathode, the anode is connected to the first terminal of the first switch and the cathode is connected to the first terminal of the capacitor to provide an over-voltage protection for the first switch, the first diode, the first rectify diode, and the choke element. The second bypass diode has an anode and a cathode, the anode is connected to the first terminal of the second switch and the cathode is connected to the first terminal of the capacitor to provide an over-voltage protection for the second switch, the second diode, the second rectify diode, and the choke element.

The detailed operation of the bridgeless power factor corrector in the positive half cycle and the negative half cycle will be described hereinafter with reference to figures.

The control unit switches the first switch and the second switch to provide an energy-storing operation to the choke element through a positive half cycle energy-storing loop sequentially formed by the AC power source, the first switch, the choke element, the second switch, and the power source when the AC power source is in the positive half cycle and the choke element is in an energy-storing operation. The control unit switches the first switch and turns off the second switch to provide an energy-releasing operation to the choke element through a positive half cycle energy-releasing loop sequentially formed by the choke element, the second diode, the capacitor, the second rectify diode, the AC power source, the first switch, and the choke element when the AC power source is in the positive half cycle and the choke element is in an energy-releasing operation. The control unit switches the first switch and the second switch to provide an energy-storing operation to the choke element through a negative half cycle energy-storing loop sequentially formed by the AC power source, the second switch, the choke element, the first switch, and the AC power source when the AC power source is in the negative half cycle and the choke element is in an energy-storing operation. The control unit switches the second switch and turns off the first switch to provide an energy-releasing operation to the choke element through a negative half cycle energy-releasing loop sequentially formed by the choke element, the first diode, the capacitor, the first rectify diode, the AC power source, the second switch, and the choke element when the AC power source is in the negative half cycle and the choke element is in an energy-releasing operation.

In conclusion, the present invention has following advantages:

1. The bridgeless circuit structure without using the bridge diodes is adopted to significantly reduce power losses and increase conversion efficiency;

2. Only one choke element Lp is used that can save occupied space of the choke element and minimize the bridgeless power factor corrector; and 3. The only one choke element Lp is used to store energy and release energy under the positive and negative half cycle, thus increasing utilization rate of the choke element Lp.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A bridgeless power factor corrector electrically connected to an AC power source, comprising:
   a choke element having a first terminal and a second terminal;
   a first switch having a first terminal and a second terminal, the first terminal connected to a first terminal of the AC power source and the second terminal connected to the first terminal of the choke element;
   a second switch having a first terminal and a second terminal, the first terminal connected to a second terminal of the AC power source and the second terminal connected to the second terminal of the choke element;
   a first diode having an anode and a cathode, the anode connected to the first terminal of the choke element;
   a second diode having an anode and a cathode, the anode connected to the second terminal of the choke element and the cathode connected to the cathode of the first diode;
   a capacitor having a first terminal and a second terminal, the first terminal connected to the cathode of the first diode and the second terminal connected to a ground;
   a first rectify diode having an anode and a cathode, the anode connected to the second terminal of the capacitor and the cathode connected to the first terminal of the first switch; and
   a second rectify diode having an anode and a cathode, the anode connected to the second terminal of the capacitor and the cathode connected to the first terminal of the second switch;
   wherein the first switch and the second switch are controlled to be turned on or turned off by a first control signal and a second control signal, respectively, and configured to provide a power factor correction for the AC power source when the AC power source is in a positive half cycle or a negative half cycle.

2. The bridgeless power factor corrector in claim 1, further comprising:
   a control unit providing the first control signal and the second control signal.

3. The bridgeless power factor corrector in claim 2, wherein the control unit is configured to switch the first switch and the second switch to provide an energy-storing operation to the choke element through a positive half cycle energy-storing loop sequentially formed by the AC power source, the first switch, the choke element, the second switch, and the AC power source when the AC power source is in the positive half cycle and the choke element is in an energy-storing operation.

4. The bridgeless power factor corrector in claim 2, wherein the control unit is configured to switch the first switch and turn off the second switch to provide an energy-releasing operation to the choke element through a positive half cycle energy-releasing loop sequentially formed by the choke element, the second diode, the capacitor, the second rectify diode, the AC power source, the first switch, and the choke element when the AC power source is in the positive half cycle and the choke element is in an energy-releasing operation.

5. The bridgeless power factor corrector in claim 2, wherein the control unit is configured to switch the first switch and the second switch to provide an energy-storing operation to the choke element through a negative half cycle energy-storing loop sequentially formed by the AC power source, the second switch, the choke element, the first switch, and the AC power source when the AC power source is in the negative half cycle and the choke element is in an energy-storing operation.

6. The bridgeless power factor corrector in claim 2, wherein the control unit is configured to switch the second switch and turn off the first switch to provide an energy-releasing operation to the choke element through a negative half cycle energy-releasing loop sequentially formed by the choke element, the first diode, the capacitor, the first rectify diode, the AC power source, the second switch, and the choke element when the AC power source is in the negative half cycle and the choke element is in an energy-releasing operation.

7. The bridgeless power factor corrector in claim 1, further comprising:
   a first bypass diode having an anode and a cathode, the anode connected to the first terminal of the first switch and the cathode connected to the first terminal of the capacitor and configured to provide an over-voltage protection for the first switch, the first diode, the first rectify diode, and the choke element, and
   a second bypass diode having an anode and a cathode, the anode connected to the first terminal of the second switch and the cathode connected to the first terminal of the capacitor and configured to provide an over-voltage protection for the second switch, the second diode, the second rectify diode, and the choke element.

8. The bridgeless power factor corrector in claim 1, wherein the bridgeless power factor corrector is electrically connected to the AC power source via an EMI filter configured to eliminate noise in the AC power source.

9. The bridgeless power factor corrector in claim 1, wherein the first switch and the second switch are MOSFETs, BJTs, or IGBTs.

10. A method of operating a bridgeless power factor corrector electrically connected to an AC power source, the method comprising:
   (a) providing a choke element having a first terminal and a second terminal;
   (b) providing a first switch and a second switch; the first switch having a first terminal and a second terminal, the first terminal connected to a first terminal of the AC power source and the second terminal connected to the first terminal of the choke element; the second switch having a first terminal and a second terminal, the first terminal connected to a second terminal of the AC power source and the second terminal connected to the second terminal of the choke element;

(c) providing a first diode and a second diode; the first diode having an anode and a cathode, the anode connected to the first terminal of the choke element; the second diode having an anode and a cathode, the anode connected to the second terminal of the choke element and the cathode connected to the cathode of the first diode;

(d) providing a capacitor having a first terminal and a second terminal, the first terminal connected to the cathode of the first diode and the second terminal connected to a ground;

(e) providing a first rectify diode and a second rectify diode; the first rectify diode having an anode and a cathode, the anode connected to the second terminal of the capacitor, the cathode connected to the first terminal of the first switch; the second rectify diode having an anode and a cathode, the anode connected to the second terminal of the capacitor and the cathode connected to the first terminal of the second switch; and (f) turning on or turning off the first switch and the second switch by a first control signal and a second control signal, respectively, to provide a power factor correction for the AC power source when the AC power source is in a positive half cycle or a negative half cycle.

11. The method of operating the bridgeless power factor corrector in claim 10, wherein in the step (f), the first control signal and the second control signal are produced by a control unit.

12. The method of operating the bridgeless power factor corrector in claim 11, wherein the control unit is configured to switch the first switch and the second switch to provide an energy-storing operation to the choke element through a positive half cycle energy-storing loop sequentially formed by the AC power source, the first switch, the choke element, the second switch, and the AC power source when the AC power source is in the positive half cycle and the choke element is in an energy-storing operation.

13. The method of operating the bridgeless power factor corrector in claim 11, wherein the control unit is configured to switch the first switch and turn off the second switch to provide an energy-releasing operation to the choke element through a positive half cycle energy-releasing loop sequentially formed by the choke element, the second diode, the capacitor, the second rectify diode, the AC power source, the first switch, and the choke element when the AC power source is in the positive half cycle and the choke element is in an energy-releasing operation.

14. The method of operating the bridgeless power factor corrector in claim 11, wherein the control unit is configured to switch the first switch and the second switch to provide an energy-storing operation to the choke element through a negative half cycle energy-storing loop sequentially formed by the AC power source, the second switch, the choke element, the first switch, and the AC power source when the AC power source is in the negative half cycle and the choke element is in an energy-storing operation.

15. The method of operating the bridgeless power factor corrector in claim 11, wherein the control unit is configured to switch the second switch and turn off the first switch to provide an energy-releasing operation to the choke element through a negative half cycle energy-releasing loop sequentially formed by the choke element, the first diode, the capacitor, the first rectify diode, the AC power source, the second switch, and the choke element when the AC power source is in the negative half cycle and the choke element is in an energy-releasing operation.

16. The method of operating the bridgeless power factor corrector in claim 10, further comprising:

(g) providing a first bypass diode and a second bypass diode; the first bypass diode having an anode and a cathode, the anode connected to the first terminal of the first switch and the cathode connected to the first terminal of the capacitor and configured to provide an over-voltage protection for the first switch, the first diode, the first rectify diode, and the choke element; the second bypass diode having an anode and a cathode, the anode connected to the first terminal of the second switch and the cathode connected to the first terminal of the capacitor and configured to provide an over-voltage protection for the second switch, the second diode, the second rectify diode, and the choke element.

17. The method of operating the bridgeless power factor corrector in claim 10, wherein the bridgeless power factor corrector is electrically connected to the AC power source via an EMI filter configured to eliminate noise in the AC power source.

18. The method of operating the bridgeless power factor corrector in claim 10, wherein the first switch and the second switch are MOSFETs, BJTs, or IGBTs.

* * * * *